United States Patent
Kelly et al.

(10) Patent No.: US 11,725,119 B2
(45) Date of Patent: Aug. 15, 2023

(54) CYANOACRYLATE COMPOSITIONS

(71) Applicant: Henkel AG & Co. KGaA, Duesseldorf (DE)

(72) Inventors: Ruth A. Kelly, Dublin (IE); Laura M. Byrne, Clane (IE)

(73) Assignee: Henkel AG & Co. KGaA, Duesseldorf (DE)

( * ) Notice: Subject to any disclaimer, the term of this patent is extended or adjusted under 35 U.S.C. 154(b) by 115 days.

(21) Appl. No.: 16/987,648

(22) Filed: Aug. 7, 2020

(65) Prior Publication Data

US 2021/0002455 A1    Jan. 7, 2021

Related U.S. Application Data

(63) Continuation of application No. PCT/EP2019/053335, filed on Feb. 11, 2019.

(30) Foreign Application Priority Data

Feb. 12, 2018  (GB) ..................... 1802243

(51) Int. Cl.
| | |
|---|---|
| *C09J 4/06* | (2006.01) |
| *C08F 220/18* | (2006.01) |
| *C08F 220/14* | (2006.01) |
| *C08K 3/36* | (2006.01) |
| *C08K 5/315* | (2006.01) |
| *C08L 33/10* | (2006.01) |
| *C09J 133/10* | (2006.01) |

(52) U.S. Cl.
CPC ............... *C09J 4/06* (2013.01); *C08F 220/14* (2013.01); *C08F 220/1804* (2020.02); *C08K 3/36* (2013.01); *C08K 5/315* (2013.01); *C08L 33/10* (2013.01); *C09J 133/10* (2013.01); *C08L 2205/02* (2013.01)

(58) Field of Classification Search
CPC ... C08F 220/14; C08F 220/1804; C08K 5/315
See application file for complete search history.

(56) References Cited

U.S. PATENT DOCUMENTS

| | | |
|---|---|---|
| 4,556,700 A | 12/1985 | Harris et al. |
| 4,622,414 A | 11/1986 | McKervey |
| 4,636,539 A | 1/1987 | Harris et al. |
| 4,695,615 A | 9/1987 | Leonard et al. |
| 4,718,966 A | 1/1988 | Harris et al. |
| 4,855,461 A | 8/1989 | Harris |
| 4,906,317 A | 3/1990 | Liu |
| 5,312,864 A | 5/1994 | Wenz et al. |
| 5,530,037 A | 6/1996 | McDonnell et al. |
| 6,310,166 B1 | 10/2001 | Hickey et al. |
| 6,607,632 B1 | 8/2003 | McDonnell et al. |

FOREIGN PATENT DOCUMENTS

| | | | |
|---|---|---|---|
| EP | 1293548 A2 | 3/2003 | |
| EP | 1369463 A1 | 12/2003 | |
| JP | 2-20581 A | 1/1990 | |
| JP | 2017160463 A | * 9/2017 | |
| WO | WO-2017094861 A1 | * 6/2017 | ........... C09D 127/12 |

OTHER PUBLICATIONS

Machine translation of WO-2017094861-A1 (Year: 2017).*
Machine translation of JP-2017160463-A (Year: 2017).*
Evonik, Jun. 3, 2011, "Dynacoll AC4830" [online], Available from http://coatings.panpage.de/En/Resins/DYNACOLL/DYNACOLL_AC_4830_e.pdf [Accessed May 15, 2018].

* cited by examiner

*Primary Examiner* — Wenwen Cai
(74) *Attorney, Agent, or Firm* — Steven C. Bauman

(57) ABSTRACT

This invention relates to cyanoacrylate-containing compositions that include, in addition to the cyanoacrylate component, a polybutylmethacrylate-polymethylmethacrylate copolymer. The inventive cyanoacrylate compositions load up to nearly a threefold increase of polybutylmethacrylate-polymethylmethacrylate copolymer over conventional polymethylmethacrylate and cured products of the inventive cyanoacrylate compositions demonstrate improved flexibility in terms of modulus (at comparable loading levels as well as increased loading levels compared to conventional polymethylmethacrylate) without compromising stability, fixture time or tensile shear strength.

16 Claims, 8 Drawing Sheets

CYANOACRYLATE COMPOSITIONS

BACKGROUND

Field

This invention relates to cyanoacrylate-containing compositions that include, in addition to the cyanoacrylate component, a polybutylmethacrylate-polymethylmethacrylate copolymer. The inventive cyanoacrylate compositions load up to nearly a threefold increase of polybutylmethacrylate-polymethylmethacrylate copolymer over conventional polymethylmethacrylate and cured products of the inventive cyanoacrylate compositions demonstrate improved flexibility in terms of modulus (at comparable loading levels as well as increased loading levels compared to conventional polymethylmethacrylate) without compromising fixture time or tensile shear strength.

BRIEF DESCRIPTION OF RELATED TECHNOLOGY

Cyanoacrylate adhesive compositions are well known, and widely used as quick setting, instant adhesives with a wide variety of uses. See H. V. Coover, D. W. Dreifus and J. T. O'Connor, "Cyanoacrylate Adhesives" in *Handbook of Adhesives,* 27, 463-77, I. Skeist, ed., Van Nostrand Reinhold, New York, 3rd ed. (1990). See also G. H. Millet, "Cyanoacrylate Adhesives" in *Structural Adhesives: Chemistry and Technology,* S. R. Hartshorn, ed., Plenum Press, New York, p. 249-307 (1986).

Cyanoacrylate adhesives typically cure to form hard, brittle products. Oftentimes, improvements in flexibility can provide a wider array of commercial opportunities. Flexibility can be somewhat enhanced by the addition of elastomers or plasticizers. Many times the enhanced flexibility is short lived, however, as the product becomes brittle as cure progresses. And while flexibility is introduced to cyanoacrylate adhesives, it is typically not maintained on ageing the product and ordinarily the shear strength of the cured adhesive is reduced as well.

Thus, it would be desirable to impart flexibility to a cyanoacrylate adhesive, which is maintained particularly after ageing, and to at least maintain the strength of the adhesive bond that is formed.

In an unrelated piece of technology, U.S. Pat. No. 6,310,166 (Hickey) is directed to and claims a method of treating tissue, comprising applying to said tissue a composition comprising a polymerizable 1,1-disubstituted ethylene monomer and poly(vinyl acetate). In the '166 patent, examples of suitable thickeners other than poly(vinyl acetate) are given as "poly(butylmethacrylate) and poly(butylacrylate), also copolymers of various acrylate and methacrylate monomers, such as poly(butylmethacrylate-co-methylmethacrylate)" and that have "a high molecular weight, preferably at least 100,000, or at least 500,000 or at least 1,000,000." (Col. 4, lines 42-45 and 60-61.)

Notwithstanding the state of the art and the efforts to date to improve the flexibility of cyanoacrylate compositions, there remained a long felt, yet unmet, need to provide flexibility to cured reaction products of such cyanoacrylate compositions without compromising strength. Until now.

SUMMARY

Cyanoacrylate compositions, which include beyond the cyanoacrylate component, a polybutylmethacrylate-polymethylmethacrylate copolymer (oftentimes referred to in the FIGS. and the Examples as "PBMA-PMMA") having a molecular weight below about 80,000 Mn are provided. The polybutylmethacrylate-polymethylmethacrylate copolymer should have a molecular weight in the range of about 10,000 Mn up to about 80,000 Mn, such as for instance about 60,000 Mn.

The inclusion of the polybutylmethacrylate-polymethylmethacrylate copolymer noted above as a filler provides for improved properties, such as flexibility, without increasing viscosity or compromising strength of the cured product or time to fixture, when compared to comparable cyanoacrylate compositions with polymethylmethacrylate (oftentimes referred to in the FIGS. and the Examples as "PMMA"), as is shown in the Examples.

The inventive cyanoacrylate compositions provide improved flexibility to cured products thereof, and an enhanced ability to retain that flexibility over time, even at lower loading levels and without showing an undesirable increase in viscosity. The inventive cyanoacrylate compositions also demonstrate high shear strengths, which are usually lost when plasticizers are added to improve flexibility. Higher loading levels may be achieved using the polybutylmethacrylate-polymethylmethacrylate copolymer, without a significant impact on viscosity and with no observable loss in curing speed.

This invention is also directed to a method of bonding together two substrates, which method includes applying to at least one of the substrates a composition as described above, and thereafter mating together the substrates.

In addition, the present invention is directed to reaction products of the inventive compositions.

The invention will be more fully understood by a reading of the section entitled "Detailed Description", which follows.

DETAILED DESCRIPTION

Figure 1A:
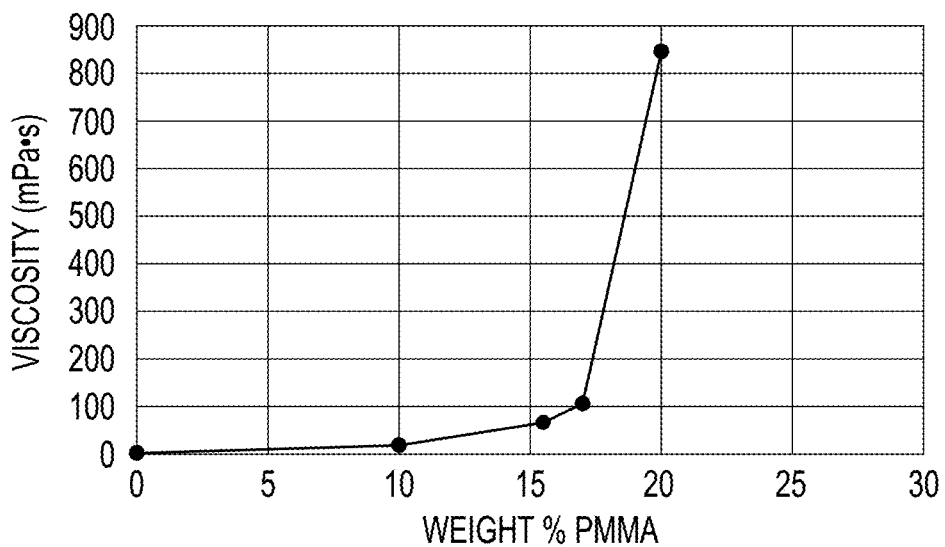
FIG. 1A depicts an x-y plot showing the viscosity increase with the increase in amount of PMMA (lower molecular weight, 80,000 g/mol) in an ethyl cyanoacrylate composition.

As noted above, this invention is directed to a cyanoacrylate composition, which includes beyond the cyanoacrylate component, a polybutylmethacrylate-polymethylmethacrylate copolymer having a molecular weight below about 80,000 Mn. In some embodiments, the polybutylmethacrylate-polymethylmethacrylate copolymer has a molecular weight in the range of about 10,000 Mn up to about 80,000 Mn. Desirably, the polybutylmethacrylate-polymethylmethacrylate copolymer has a molecular weight of about 60,000 Mn.

Here, rather than using a conventional thickener, polymethylmethacrylate, a polybutylmethacrylate-polymethylmethacrylate copolymer having the molecular weight ceiling noted above has been used with surprising and unexpected results. Examples of these polybutylmethacrylate-polymethylmethacrylate copolymers are available commercially from Evonik GmbH, Essen, DE under the trade name DYNACOLL. A specific example of such a copolymer is DYNACOLL AC 4830.

The polybutylmethacrylate-polymethylmethacrylate copolymer should be present in an amount up to about 50 percent by weight of the total composition, such as in the range of about 10 percent by weight to about 45 percent by weight of the total composition, desirably about 15 percent by weight to about 25 percent by weight of the total composition.

At this molecular weight and percent by weight in the composition, the polybutylmethacrylate-polymethylmethacrylate copolymer influences the cured products of the cyanoacrylate compositions to demonstrate improved flexibility measured using a three point bending test without compromising strength compared to polymethylmethacrylate present at least the same loading level. The three point bending test used in the practice of this invention is described as according to ASTM D790-03, which relates to measuring the flexural properties of plastics. Here, when the cyanoacrylate composition is cured an assembly constructed from bonded plastic is formed, which is then stored and tested at room temperature and humidity (temperature controlled at 22±1° C., humidity typically in the range 30-50%).

The inventive composition is flowable at room temperature and should have a viscosity up to about 175,000 mPa·s, such as up to about 100,000 mPa·s.

In one aspect, the polybutylmethacrylate-polymethylmethacrylate copolymer used in the inventive composition should be present in an amount up to about 50 percent by weight of the total composition and afford a viscosity of the inventive composition of up to about 1750,000 mPa·s, such as up to about 100,000 mPa·s.

In this aspect, once cured, the inventive composition should exhibit a Modulus of Elasticity (referred to hereinafter as "modulus") after a period of time of about 1 week at a temperature of about 22° C. of less than about 2,000 MPa, such as about 1,700 MPa, for instance 1,500 MPa.

In another aspect, the polybutylmethacrylate-polymethylmethacrylate copolymer should be present in an amount in the range of about 2 percent by weight to about 45 percent by weight of the total composition.

In this aspect, once cured, the inventive composition should exhibit a modulus after a period of time of about 2 weeks at a temperature of about 22° C. of less than about 2,000 MPa, such as about 1,700 MPa, for instance 1,500 MPa.

The cyanoacrylate component includes cyanoacrylate monomers which may be chosen with a raft of substituents, such as those represented by $H_2C=C(CN)-COOR$, where R is selected from $C_{1-15}$ alkyl, alkoxyalkyl, cycloalkyl, alkenyl, aralkyl, aryl, allyl and haloalkyl groups. Desirably, the cyanoacrylate monomer is selected from methyl cyanoacrylate, ethyl-2-cyanoacrylate, propyl cyanoacrylates, butyl cyanoacrylates (such as n-butyl-2-cyanoacrylate), octyl cyanoacrylates, allyl cyanoacrylate, β-methoxyethyl cyanoacrylate and combinations thereof. A particularly desirable one is ethyl-2-cyanoacrylate.

The cyanoacrylate component should be included in the compositions in an amount within the range of from about 55 percent by weight to about 98 percent by weight, with the range of about 90 percent by weight to about 99 percent by weight being desirable, and about 95 percent by weight of the total composition being particularly desirable.

Accelerators may also be included in the inventive cyanoacrylate compositions, such as any one or more selected from calixarenes and oxacalixarenes, silacrowns, crown ethers, cyclodextrins, poly(ethyleneglycol) di(meth)acrylates, ethoxylated hydric compounds and combinations thereof.

Of the calixarenes and oxacalixarenes, many are known, and are reported in the patent literature. See e.g. U.S. Pat. Nos. 4,556,700, 4,622,414, 4,636,539, 4,695,615, 4,718, 966, and 4,855,461, the disclosures of each of which are hereby expressly incorporated herein by reference.

For instance, as regards calixarenes, those within the following structure are useful herein:

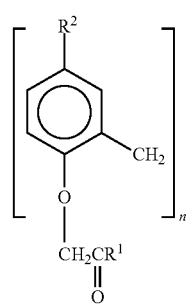

where R¹ is alkyl, alkoxy, substituted alkyl or substituted alkoxy; R² is H or alkyl; and n is 4, 6 or 8.

One particularly desirable calixarene is tetrabutyl tetra[2-ethoxy-2-oxoethoxy]calix-4-arene.

A host of crown ethers are known. For instance, any one or more of 15-crown-5, 18-crown-6, dibenzo-18-crown-6, benzo-15-crown-5-dibenzo-24-crown-8, dibenzo-30-crown-10, tribenzo-18-crown-6, asym-dibenzo-22-crown-6, dibenzo-14-crown-4, dicyclohexyl-18-crown-6, dicyclohexyl-24-crown-8, cyclohexyl-12-crown-4, 1,2-decalyl-15-crown-5, 1,2-naphtho-15-crown-5, 3,4,5-naphtyl-16-crown-5, 1,2-methyl-benzo-18-crown-6, 1,2-methylbenzo-5, 6-methylbenzo-18-crown-6, 1,2-t-butyl-18-crown-6, 1,2-vinylbenzo-15-crown-5, 1,2-vinylbenzo-18-crown-6, 1,2-t-butyl-cyclohexyl-18-crown-6, asym-dibenzo-22-crown-6 and 1,2-benzo-1,4-benzo-5-oxygen-20-crown-7 may be used. See U.S. Pat. No. 4,837,260 (Sato), the disclosure of which is hereby expressly incorporated herein by reference. Of the silacrowns, again many are known, and are reported in the literature.

Specific examples of silacrown compounds useful in the inventive compositions include:

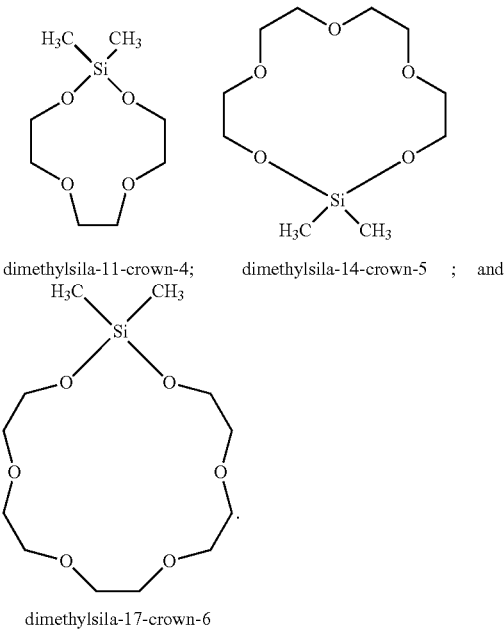

dimethylsila-11-crown-4; dimethylsila-14-crown-5 ; and dimethylsila-17-crown-6

See e.g. U.S. Pat. No. 4,906,317 (Liu), the disclosure of which is hereby expressly incorporated herein by reference.

Many cyclodextrins may be used in connection with the present invention. For instance, those described and claimed in U.S. Pat. No. 5,312,864 (Wenz), the disclosure of which is hereby expressly incorporated herein by reference, as hydroxyl group derivatives of an α, β or γ-cyclodextrin which is at least partly soluble in the cyanoacrylate would be appropriate choices for use herein as the first accelerator component.

For instance, poly(ethylene glycol) di(meth)acrylates suitable for use herein include those within the following structure:

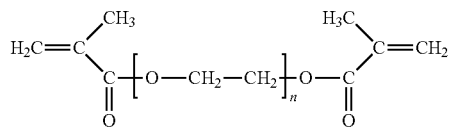

where n is greater than 3, such as within the range of 3 to 12, with n being 9 as particularly desirable. More specific examples include PEG 200 DMA, (where n is about 4) PEG 400 DMA (where n is about 9), PEG 600 DMA (where n is about 14), and PEG 800 DMA (where n is about 19), where the number (e.g., 400) represents the average molecular weight of the glycol portion of the molecule, excluding the two methacrylate groups, expressed as grams/mole (i.e., 400 g/mol). A particularly desirable PEG DMA is PEG 400 DMA.

And of the ethoxylated hydric compounds (or ethoxylated fatty alcohols that may be employed), appropriate ones may be chosen from those within the following structure:

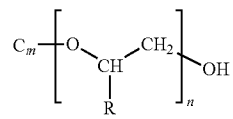

where $C_m$ can be a linear or branched alkyl or alkenyl chain, m is an integer between 1 to 30, such as from 5 to 20, n is an integer between 2 to 30, such as from 5 to 15, and R may be H or alkyl, such as $C_{1-6}$ alkyl.

When used, the accelerator embraced by the above structures should be included in the compositions in an amount within the range of from about 0.01 percent by weight to about 10 percent by weight, with the range of about 0.1 by weight to about 0.5 percent by weight being desirable, and about 0.4 percent by weight of the total composition being particularly desirable.

A stabilizer package is also ordinarily found in cyanoacrylate compositions. The stabilizer package may include one or more free radical stabilizers and anionic stabilizers, each of the identity and amount of which are well known to those of ordinary skill in the art. See e.g. U.S. Pat. Nos. 5,530,037 and 6,607,632, the disclosures of each of which are hereby incorporated herein by reference.

The inventive compositions may also include a rubber toughening component. Oftentimes, the rubber toughening component may be selected from (a) reaction products of the combination of ethylene, methyl acrylate and monomers having carboxylic acid cure sites, (b) dipolymers of ethylene and methyl acrylate, (c) vinylidene chloride-acrylonitrile copolymers, (d) vinyl chloride/vinyl acetate copolymer, (e) copolymers of polyethylene and polyvinyl acetate, and combinations thereof.

Desirably, the rubber toughening component is a reaction product of the combination of ethylene, methyl acrylate and monomers having carboxylic acid cure sites, wherein the reaction product is free of release agents, anti-oxidants, stearic acid and polyethylene glycol ether wax.

The rubber toughener, when used, should be present in an amount of up to about 8 percent by weight, such as about 2 percent by weight to about 4 percent by weight of the total composition.

The inventive compositions may also include a plasticizer. Examples of suitable plasticizers are legion. For instance, the plasticizer is suitably selected from at least one of alkyleneglycol diesters or hydroxy carboxylic acid esters. Alkyleneglycol diesters of Formula I are useful:

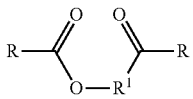

I where:
 each R is independently phenyl or hydroxyphenyl;
 R'=—[(CH$_2$)$_n$—O]$_m$—;
 n is an integer from 1 to 4; and
 m is 1 or 2.

Useful hydroxy carboxylic acid esters include those wherein the structural formula of the plasticizer contains one or more moieties or "B" or "C" below, but at least one moiety "A". The two remaining free valences (at both ends of the molecule) are saturated either with —H or —CH$_3$.

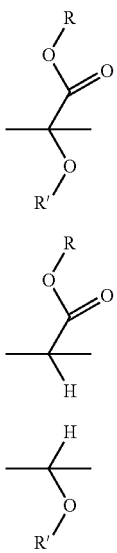

where:
 R is —CH$_3$, —C$_2$H$_5$, -propyl, -iso-propyl, -butyl, -iso-butyl, -sec-butyl, -t-butyl; and
 R' is —C(O)H, —C(O)CH$_3$, —C(O)C$_2$H$_5$.

In the case of more than one R group in a molecule, R is independently selected from those moieties above i.e. each R group does not have to be the same. The same is true also for R' where there is more than one R'.

Examples of a hydroxy carboxylic acid esters is a citrate ester:

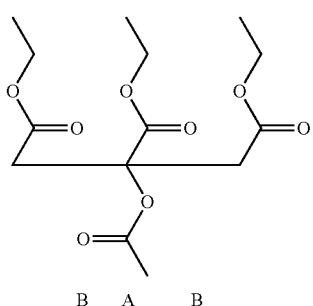

Thus, the molecule would correspond to "H—B—A—B—H" (H=hydrogen terminus). Other examples are esters of isocitric acid, tartaric acid, malic acid, lactic acid, glyceric acid and glycolic acid.

Suitable plasticizers for incorporation in the plasticizer component include the following trimethyl trimellitate, diethylene glycol dibenzoate, diethyl malonate, triethyl-O-acetyl citrate, benzylbutyl phthalate, dipropylene glycol dibenzoate, diethyl adipate, tributyl-O-acetyl citrate, dimethyl sebacate, and combinations thereof.

Plasticizers which have contributed to polymeric materials demonstrating particularly good properties include tributyl-O-acetyl citrate ("TBAC"), triethyl-O-acetyl citrate ("TEAC"), dipropylene glycol dibenzoate ("DPGDB"), diethylene glycol dibenzoate ("DEGBD") and glycerol triacetate ("GTA").

A particularly desirable example of plasticizer is GTA.

The plasticizer, when used, should be present in an amount of up to about 20 percent by weight, such as about 5 percent by weight to about 10 percent by weight, of the total composition.

The inventive compositions may also include a thixotrope (such as fumed silica), a gelling agent, and/or a thickener, as appropriate for a given application.

Reaction products of the inventive compositions are also provided.

In another aspect of the invention, there is provided a method of bonding together two substrates, which method includes applying to at least one of the substrates a composition as described above, and thereafter mating together the substrates for a time sufficient to permit the adhesive to fixture.

In yet another aspect of the invention, there are provided reaction products of the so-described compositions.

In still another aspect of the invention, there is provided a method of preparing the so-described compositions. The method includes providing a cyanoacrylate component, and combining therewith with mixing a polybutylmethacrylate-polymethylmethacrylate copolymer.

The invention will be further illustrated by the examples which follow.

EXAMPLES

All samples were prepared by mixing together the noted constituents for a sufficient period of time to ensure substantial homogeneity of the constituents. Ordinarily, about 30 minutes suffices, depending of course on the quantity of the constituents used.

Example 1

Figure 1B:
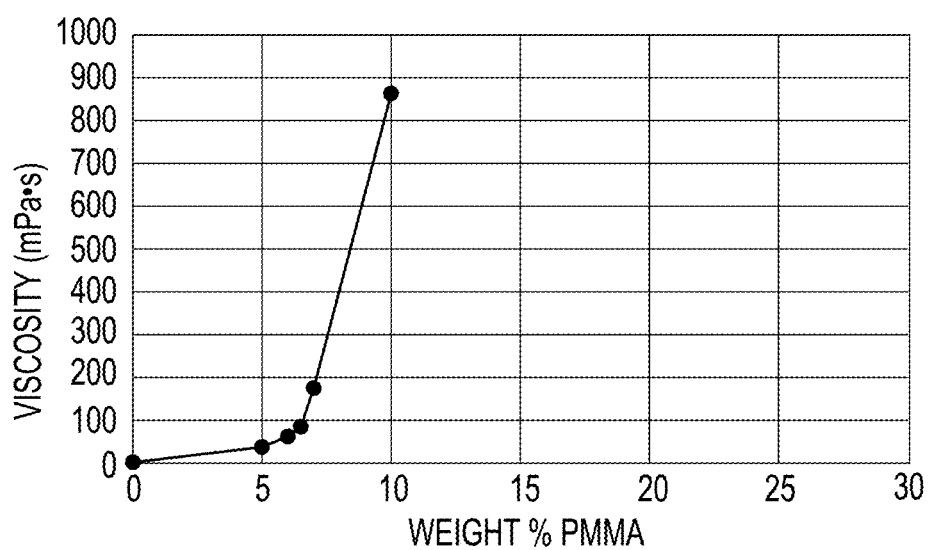
FIG. 1B depicts an x-y plot showing the viscosity increase with the increase in amount of PMMA (higher molecular weight, 450,000 g/mol) in an ethyl cyanoacrylate composition.
Figure 1C:
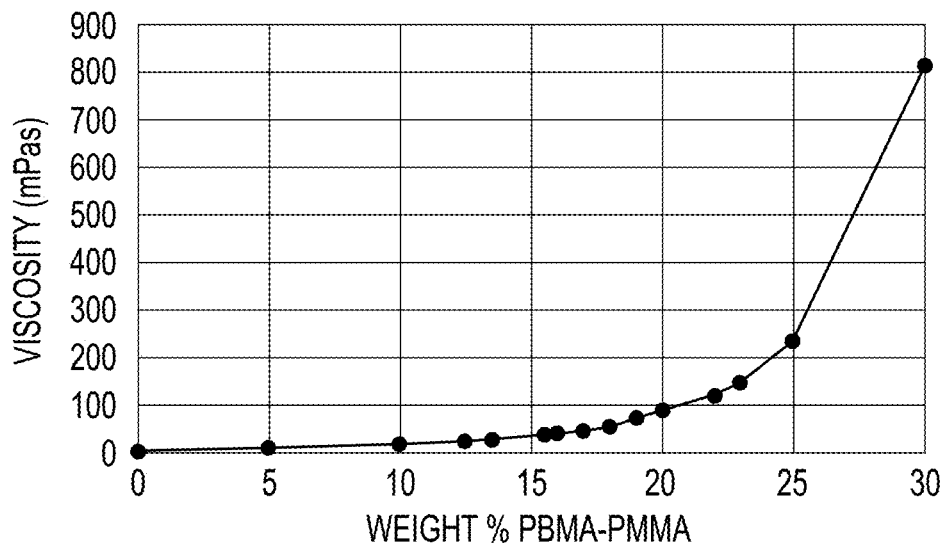
FIG. 1C depicts an x-y plot showing the viscosity increase with the increase in amount of PBMA-PMMA (60,000 g/mol) in an ethyl cyanoacrylate composition.

Viscosity Measurements/Replacement of PMMA with PBMA-PMMA in Ethyl Cyanoacrylate Compositions Here, viscosity measurements were taken for PMMA (at two different molecular weights) and PBMA-PMMA (at a 60,000 Mn) in ethyl cyanoacrylate at various loading levels. Tables 1A, 1B and 1C below show the loadings and the observed respective viscosities. FIGS. 1A, 1B and 1C depict these values, respectively, in an x-y plot.

TABLE 1A

| PMMA (80,000 g/mol[1]) (Wt %) | Viscosity (mPa · s) |
|---|---|
| 0 | 2.06 |
| 10 | 18.4 |

TABLE 1A-continued

| PMMA (80,000 g/mol[1]) (Wt %) | Viscosity (mPa · s) |
|---|---|
| 15.5 | 66.2 |
| 17 | 106 |
| 20 | 846 |

TABLE 1B

| PMMA (450,000 g/mol[−1]) (Wt %) | Viscosity (mPa · s) |
|---|---|
| 0 | 2.06 |
| 5 | 37.6 |
| 6 | 62.1 |
| 6.5 | 84.8 |
| 7 | 175 |
| 10 | 863 |

TABLE 1C

| PBMA-PMMA (60,000 g/mol[−1]) (Wt %) | Viscosity (mPa · s) |
|---|---|
| 0 | 2.06 |
| 5 | 5.01 |
| 10 | 12.5 |
| 12.5 | 18.9 |
| 13.5 | 22.9 |
| 15.5 | 33.8 |
| 16 | 35.7 |
| 17 | 44 |
| 18 | 52.3 |
| 19 | 69.2 |
| 20 | 85.7 |
| 22 | 117 |
| 23 | 144 |
| 25 | 232 |
| 30 | 814 |

Figure 1D:
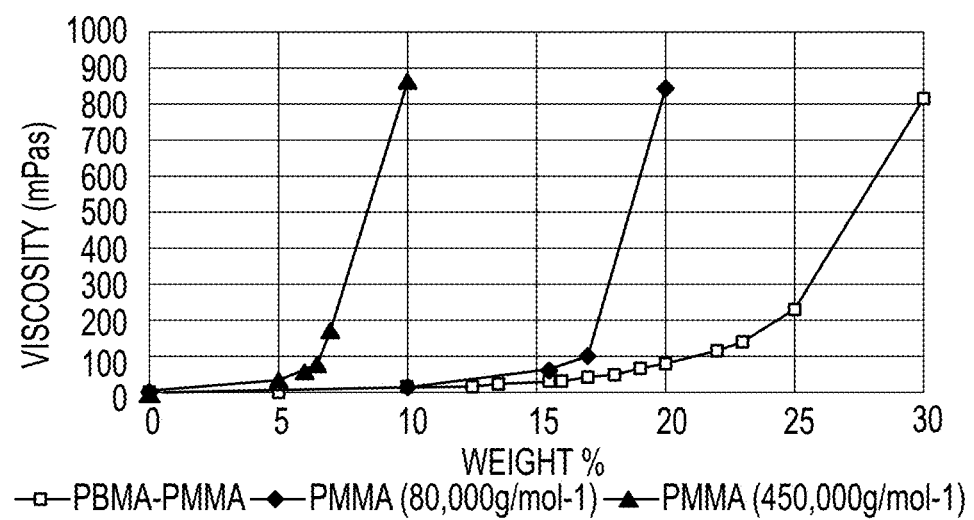
FIG. 1D depicts an x-y plot showing an amalgam of FIGS. 1A-1C, illustrating the viscosity increase with the increase in amount of the three polymers in an ethyl cyanoacrylate composition.

At a loading level of about 20 percent by weight of PBMA-PMMA, the ethyl cyanoacrylate increases viscosity only sparingly to less than 100 mPa·s (about 85 mPa·s). In contrast, PMMA at this loading level shows about a ten-fold increase in viscosity for the lower molecular weight PMMA. And for the higher molecular weight PMMA, at a loading level of only about 10 percent by weight comparable, greater than about 800 mPa·s viscosities are achieved. And in order to reach a viscosity of greater than about 800 mPa·s with PBMA-PMMA, a loading level of about 30 percent by weight should be used. Reference to Table 1D and FIG. 1D, which captures all of the data of the preceding tables and figures, shows these observations.

TABLE 1D

| | Identity/Viscosity (mPa · s) | | |
|---|---|---|---|
| Amount (Wt %) | PBMA-PMMA (60,000 g/mol[−1]) | PMMA (80,000 g/mol[−1]) | PMMA (450,000 g/mol[−1]) |
| 0 | 2.06 | 2.06 | 2.06 |
| 5 | 5.01 | | 37.6 |
| 6 | | | 62.1 |
| 6.5 | | | 84.8 |
| 7 | | | 175 |
| 10 | 12.5 | 18.4 | 863 |
| 12.5 | 18.9 | | |
| 13.5 | 22.9 | | |
| 15.5 | 33.8 | 66.2 | |
| 16 | 35.7 | | |
| 17 | 44 | 106 | |
| 18 | 52.3 | | |
| 19 | 69.2 | | |
| 20 | 85.7 | | 846 |
| 22 | 117 | | |
| 23 | 144 | | |
| 25 | 232 | | |
| 30 | 814 | | |

This data demonstrates that PBMA-PMMA can be used at higher levels than PMMA without compromising the viscosity or as shown later negatively impacting stability and tensile strength performance.

Example 2

Viscosity Measurements/Silica-Filled PMMA-Containing or PBMA-PMMA-Containing Ethyl Cyanoacrylate Compositions Silica was added to each of the PMMA-containing ethyl cyanoacrylate composition and the PBMA-PMMA-containing ethyl cyanoacrylate composition at varying levels, as shown below in Tables 2A (for the PMMA-containing compositions) and 2B (for the PBMA-PMMA-containing compositions). The PMMA (80,000 g/mol) and the PBMA-PMMA were each added at a level of 15.5 percent by weight.

TABLE 2A

| Silica (Wt %) | Viscosity @ 20 s[−1] (mPa · s) | Casson Viscosity (mPa · s) |
|---|---|---|
| 1 | 59 | 47 |
| 2 | 240 | 71 |
| 3 | 535 | 93 |
| 4 | 1460 | 94 |
| 5 | 3070 | 204 |
| 6 | 6450 | 210 |
| 7 | 13500 | 782 |
| 8 | 20200 | 911 |

TABLE 2B

| Silica (Wt %) | Viscosity @ 20 s[−1] (mPa · s) | Casson Viscosity (mPa · s) |
|---|---|---|
| 1 | 143 | 97 |
| 2 | 462 | 124 |
| 3 | 1000 | 173 |
| 4 | 2470 | 215 |
| 5 | 4170 | 276 |
| 6 | 10300 | 331 |
| 7 | 13000 | 601 |
| 8 | 20600 | 578 |

Figure 2A:
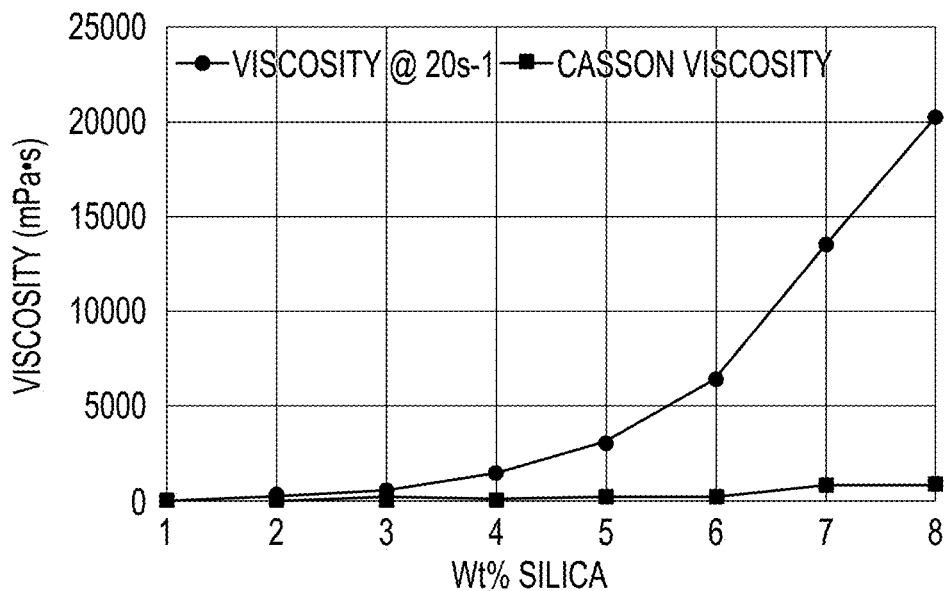
FIG. 2A depicts an x-y plot showing the viscosity increase with the increase of silica in an ethyl cyanoacrylate composition containing 15.5 percent by weight PMMA (lower molecular weight).
Figure 2B:
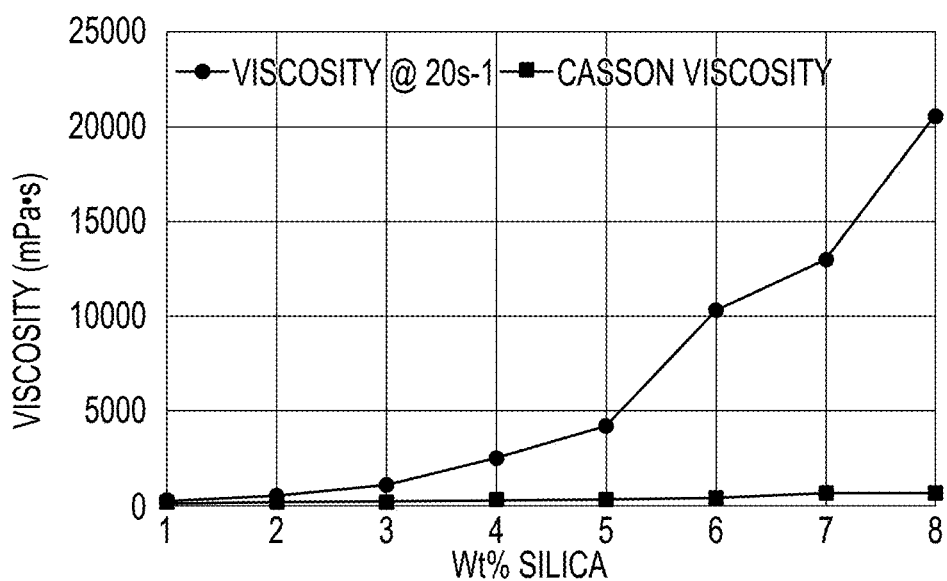
FIG. 2B depicts an x-y plot showing the viscosity increase with the increase of silica in an ethyl cyanoacrylate composition containing 15.5 percent by weight PBMA-PMMA.

Tables 2A and 2B capture the viscosity of silica-containing ethyl cyanoacrylate compositions with PBMA-PMMA and silica-containing ethyl cyanoacrylate compositions with PMMA, at progressively higher loading levels on a percent by weight basis. These data are depicted in FIGS. 2A and 2B, respectively.

This demonstrates that PBMA-PMMA, when combined with silica, can produce ethyl cyanoacrylate compositions having thixotropy, in a similar way to PMMA.

Example 3

Viscosity Measurements/Silica-Filled Rubber Toughened PMMA-Containing or PBMA-PMMA-Containing Ethyl Cyanoacrylate Compositions Four percent by weight of a rubber toughener (here, VAMAC VCS 5500, from Dow DuPont) and varying silica levels were added to each of a PMMA-containing ethyl cyanoacrylate composition and a PBMA-PMMA-containing ethyl cyanoacrylate composition. The PMMA (80,000 g/mol) and the PBMA-PMMA were added at a level of 15.5 percent by weight.

TABLE 3A

| Silica (Wt %) | Viscosity @ 20 s$^{-1}$ (mPa · s) | Casson Viscosity (mPa · s) |
|---|---|---|
| 2 | 1040 | 249 |
| 4 | 5940 | 565 |
| 5 | 8360 | 474 |
| 6 | 17200 | 1176 |
| 8 | 24700 | 1124 |

TABLE 3B

| Silica (Wt %) | Viscosity @ 20 s$^{-1}$ (mPa · s) | Casson Viscosity (mPa · s) |
|---|---|---|
| 2 | 788 | 454 |
| 4 | 2650 | 538 |
| 5 | 4120 | 545 |
| 6 | 7220 | 546 |
| 8 | 33600 | 566 |

Figure 3A:
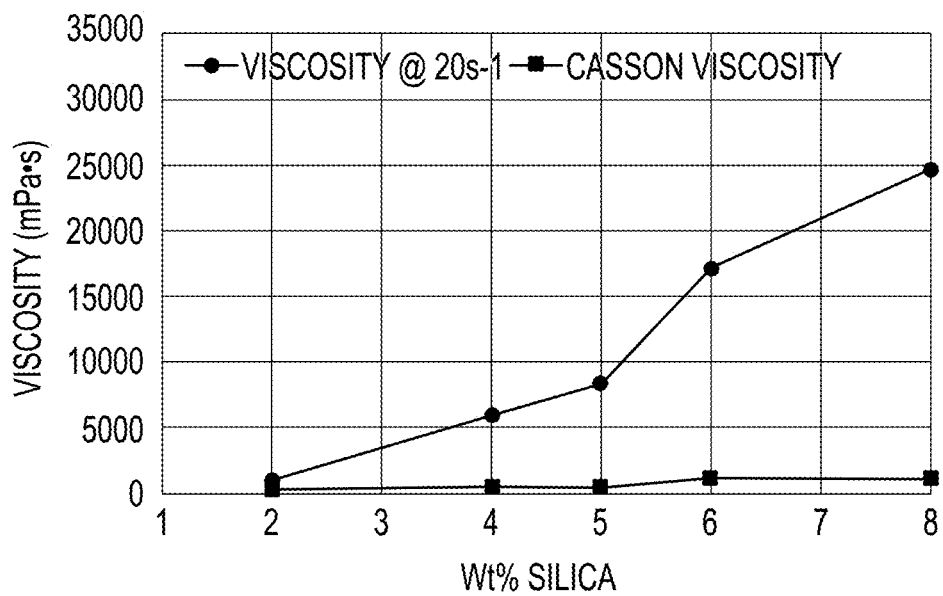
FIG. 3A depicts an x-y plot showing the viscosity increase with the increase of silica in an ethyl cyanoacrylate composition containing 4 percent by weight rubber toughener and 15.5 percent by weight PMMA (lower molecular weight).
Figure 3B:
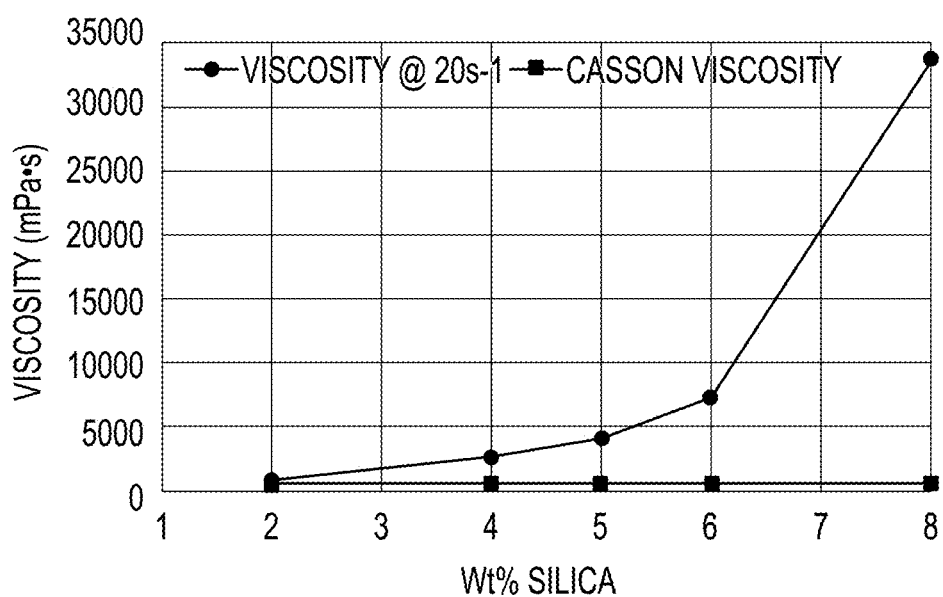
FIG. 3B depicts an x-y plot showing the viscosity increase with the increase of silica in an ethyl cyanoacrylate composition containing 4 percent by weight rubber toughener and 15.5% of PBMA-PMMA

Tables 3A and 3B capture the viscosity of silica-containing rubber toughened ethyl cyanoacrylate compositions with PBMA-PMMA and silica-containing rubber toughened ethyl cyanoacrylate compositions with PMMA, respectively, at progressively higher levels on a percent by weight basis. These data are depicted in FIGS. 3A and 3B, respectively. The viscosity data demonstrates that an ethyl cyanoacrylate composition in gel formed is produced where PBMA-PMMA and silica are combined, in the presence of a rubber toughener.

Example 4

Modulus Evaluations/PMMA-Containing or PBMA-PMMA-Containing Ethyl Cyanoacrylate Compositions with and without Silica Table 4 below shows the constituents of four ethyl cyanoacrylate compositions, each of which containing a package of stabilizer, accelerator and shock resistant additive at a level of 0.1015 percent by weight.

TABLE 4

| | Samples/Amt (Wt %) | | | |
|---|---|---|---|---|
| Constituents | A | B | E | F |
| Ethyl cyanoacrylate | 84.4 | 84.4 | 80.4 | 80.4 |
| PBMA—PMMA | 15.5 | 0 | 15.5 | 0 |

TABLE 4-continued

| | Samples/Amt (Wt %) | | | |
|---|---|---|---|---|
| Constituents | A | B | E | F |
| PMMA | 0 | 15.5 | 0 | 15.5 |
| Silica | 0 | 0 | 4 | 4 |

Figure 4:
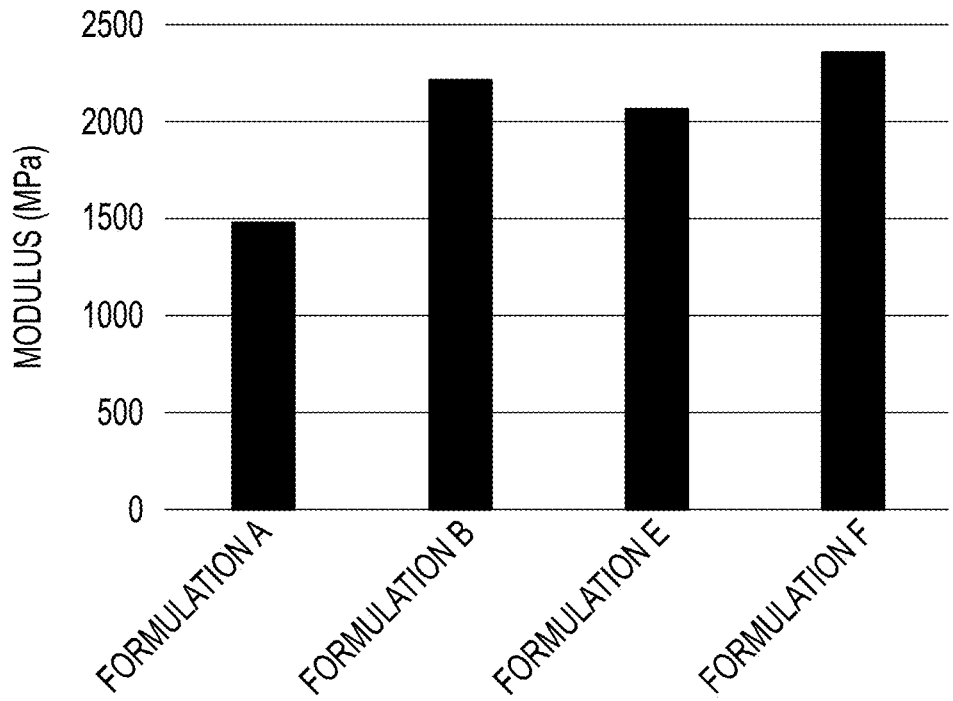
FIG. 4 depicts a bar chart of modulus (in MPa) of Samples A, B, E and F, which have 15.5 percent by weight of either PMMA or PBMA-PMMA, with and without 4 percent by weight of silica.

The samples were each cured on a plastic mold for a period of time of 24 hours and the modulus results from three point bending tests after the 24 hour cure time are captured in Table 5 below and shown in FIG. 4.

TABLE 5

| Sample | Modulus (MPa) |
|---|---|
| A | 1479 |
| B | 2214 |
| E | 2065 |
| F | 2357 |

The ethyl cyanoacrylate compositions with PBMA-PMMA show improved modulus when compared to the compositions with PMMA, both with and without silica.

Example 5

Modulus Evaluations/Plasticized PMMA-Containing or PBMA-PMMA-Containing Ethyl Cyanoacrylate Compositions with and without Silica Table 6 below shows the constituents of four ethyl cyanoacrylate compositions, each of which containing a package of stabilizer, accelerator and shock resistant additive at a level of 0.1015 percent by weight. The compositions were prepared using either PMMA or PBMA-PMMA. Here, however, 10 percent by weight of a plasticizer (here, glycerol triacetin) was added to each of the compositions. Four percent by weight of silica was also added to two of the four compositions.

TABLE 6

| | Samples/Amt (Wt %) | | | |
|---|---|---|---|---|
| Constituents | C | D | G | H |
| Ethyl cyanoacrylate | 74.4 | 74.4 | 70.4 | 70.4 |
| PBMA—PMMA | 15.5 | 0 | 15.5 | 0 |
| PMMA | 0 | 15.5 | 0 | 15.5 |
| Plasticizer | 10 | 10 | 10 | 10 |
| Silica | 0 | 0 | 4 | 4 |

Figure 5:
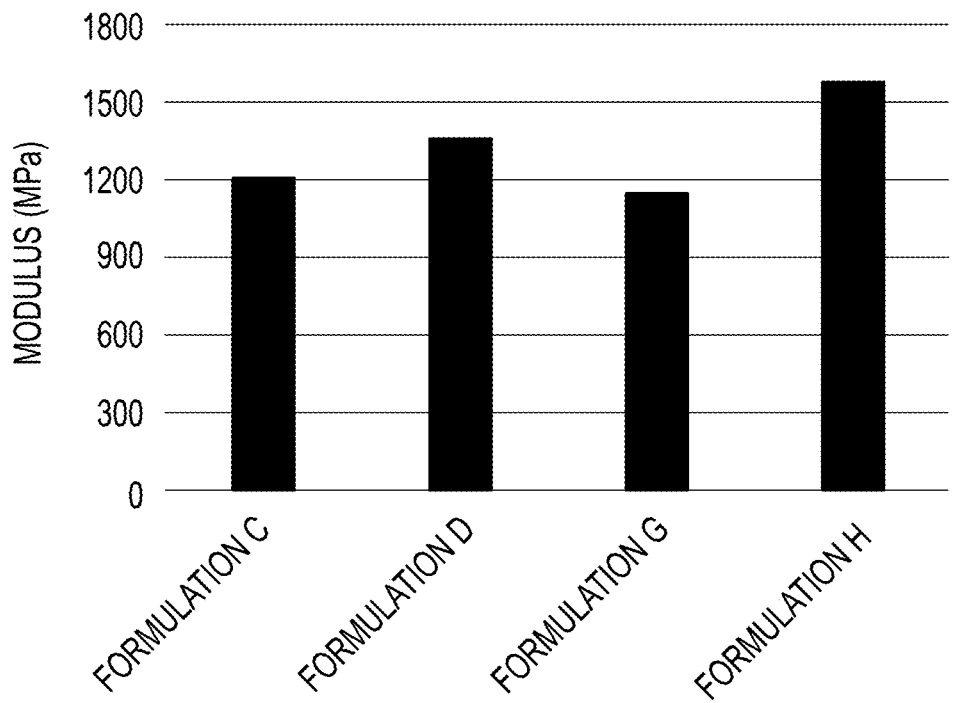
FIG. 5 depicts a bar chart of modulus (in MPa) of Samples C, D, G and H, which have 15.5 percent by weight of either PMMA or PBMA-PMMA, with and without 4 percent by weight of silica, and 10 percent by weight of plasticizer.

The samples were each cured on a plastic mold for a period of time of 24 hours and the modulus results for three point bending tests after the 24 hours cure time are captured in Table 7 below and shown in FIG. 5.

TABLE 7

| Sample | Modulus (MPa) |
|---|---|
| C | 1193 |
| D | 1347 |
| G | 1136 |
| H | 1578 |

The plasticized ethyl cyanoacrylate compositions with PBMA-PMMA show a decrease in modulus when compared to the compositions with PMMA, both with and without silica. In combination with traditional plasticisers, the PBMA-PMMA-containing ethyl cyanoacrylate compositions still shows an advantage over PMMA-containing ethyl cyanoacrylate compositions.

Example 6

Modulus Evaluations/Rubber Toughened PMMA- or PBMA-PMMA-Containing Ethyl Cyanoacrylate Compositions Table 8 shows the constituents of two ethyl cyanoacrylate compositions, each of which containing a package of stabilizer, accelerator and shock resistant additive at a level of 0.2145 percent by weight. The compositions were prepared using either PMMA or PBMA-PMMA. Here, however, 4 percent by weight of a rubber toughener (here, VAMAC VCS 5500) was added to each of the compositions.

TABLE 8

| Constituents | Samples/Amt (Wt %) | |
| --- | --- | --- |
| | I | J |
| Ethyl cyanoacrylate | 92.8 | 92.8 |
| Rubber toughener | 4 | 4 |
| PBMA—PMMA | 3 | 0 |
| PMMA | 0 | 3 |

Figure 6:
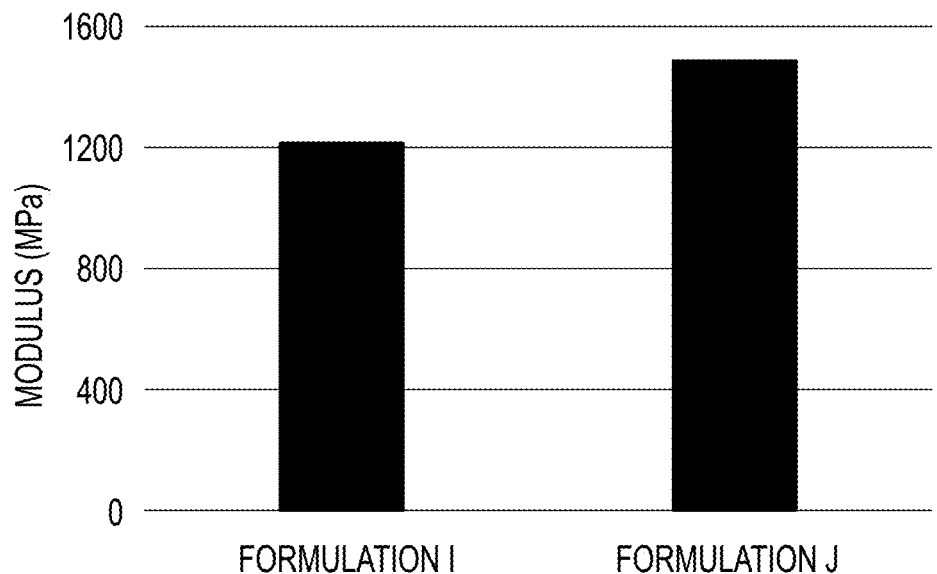
FIG. 6 depicts a bar chart of modulus (in MPa) of Samples I and J, which have 4 percent by weight of rubber toughener and 3 percent by weight of either PMMA or PBMA-PMMA.

The samples were each cured on a plastic mold for a period of time of about 24 hours and the modulus results from the three point bending tests carried out after the 24 hour cure are captured in Table 9 below and shown in FIG. 6 (together with Samples A and B).

TABLE 9

| Sample | Modulus (MPa) |
| --- | --- |
| I | 1216 |
| J | 1487 |

As in Example 5, this shows that combining PBMA-PMMA with rubber tougheners in an ethyl cyanoacrylate composition confers improved performance over a comparable composition with PMMA instead, with respect to modulus values, without compromising the toughness achieved from the rubber material.

Example 7

Modulus and Tensile Shear Strength Evaluations/Silica-Filled Rubber Toughened PMMA-Containing or PBMA-PMMA-Containing Ethyl Cyanoacrylate Compositions Table 10 shows the constituents of two ethyl cyanoacrylate compositions, each of which containing a package of stabilizer, accelerator and shock resistant additive at a level of 0.2145 percent by weight. The compositions were prepared using either PMMA or PBMA-PMMA. Here, however, 6 percent by weight of a rubber toughener (here, VAMAC VCS 5500) and 4 percent by weight of silica was added to each of the compositions.

TABLE 10

| Constituents | Samples/Amt (Wt %) | |
| --- | --- | --- |
| | K | L |
| Ethyl cyanoacrylate | 92.8 | 92.8 |
| Fumed silica | 4 | 4 |
| Rubber toughener | 6 | 6 |
| PBMA—PMMA | 3 | 0 |
| PMMA | 0 | 3 |

Figure 7:
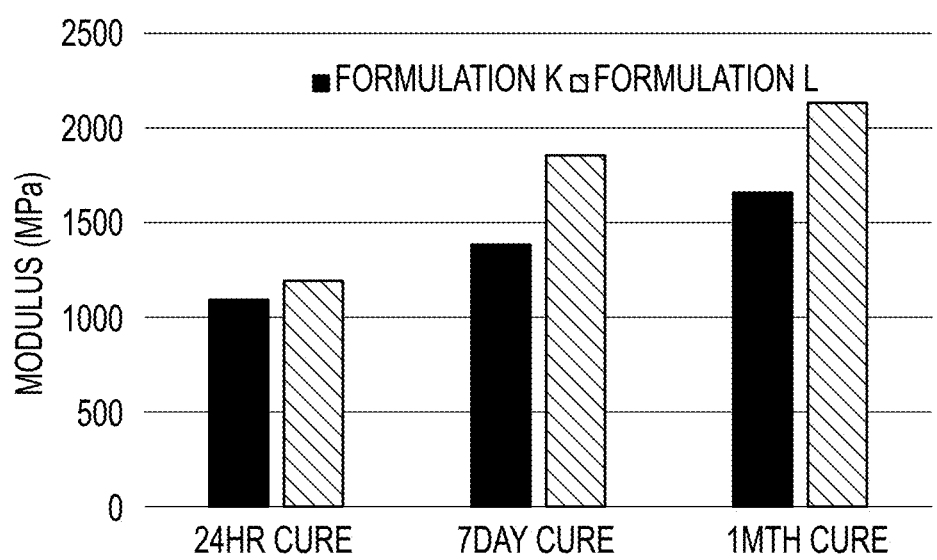
FIG. 7 depicts a bar chart of modulus (in MPa) of Samples K and L, which have 3 percent by weight of either PMMA or PBMA-PMMA, 6 percent by weight of rubber toughener and 4 percent by weight of silica. The cure intervals depicted are 24 hours, 7 days, and 1 month.

The samples were each cured on a plastic mold for a period of time of about 24 hours and the modulus results from the three point bending tests carried out after 24 hours, 7 days and 1 month cure intervals are captured in Table 11 below and shown in FIG. 7.

TABLE 11

| Cure Time | Modulus (MPa) | |
| --- | --- | --- |
| | K | L |
| 24 hours | 1096 | 1196 |
| 7 days | 1385 | 1861 |
| 1 month | 1667 | 2140 |

Figure 8:
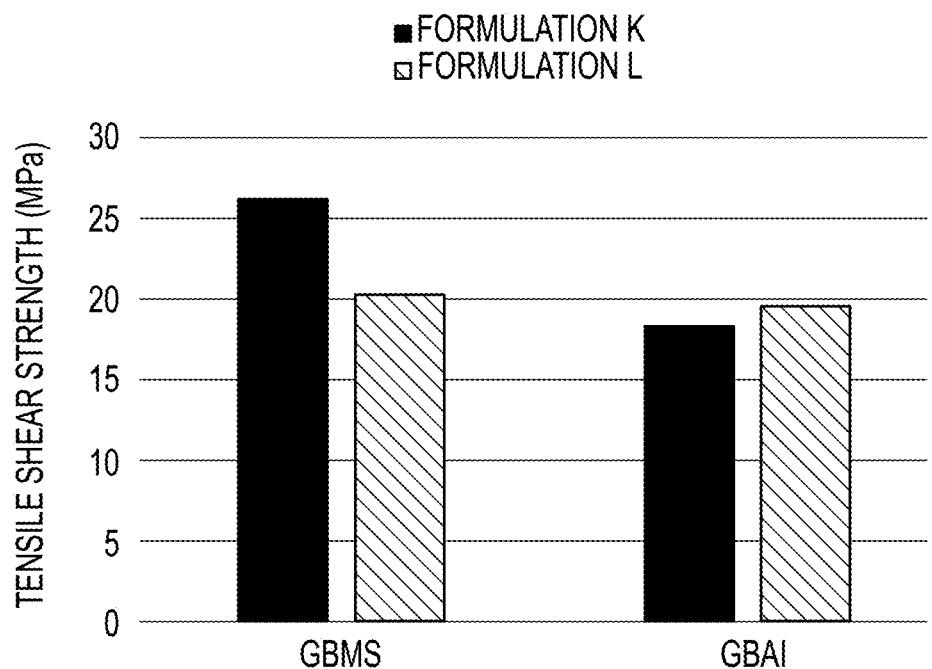
FIG. 8 depicts a bar chart of tensile shear strength (in MPa) of Samples K and L, on two different substrates.
Figure 9:
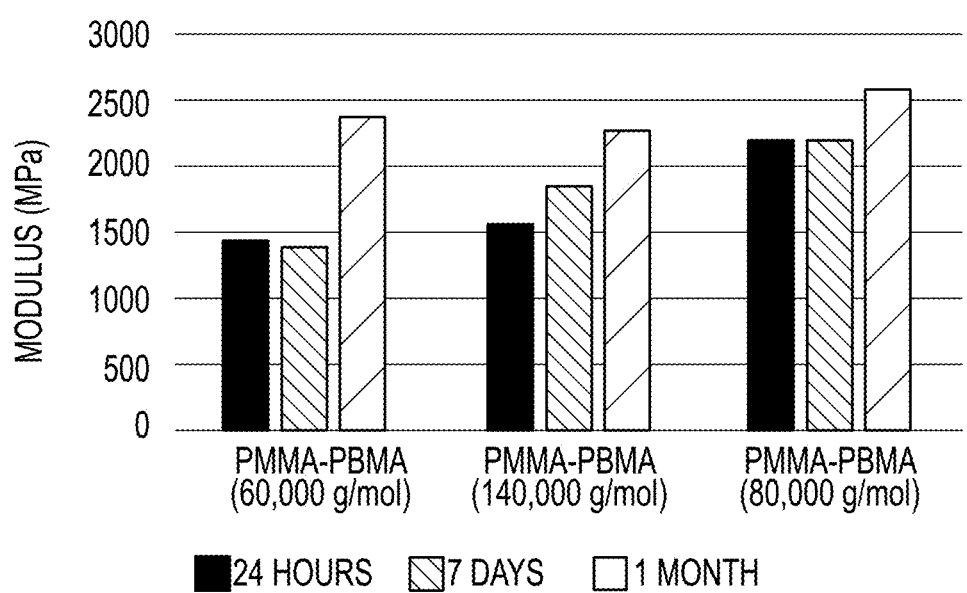
FIG. 9 depicts a bar chart of modulus (in MPa), of a cyanoacrylate composition made from ethyl cyanoacrylate containing 15.5 percent by weight of either PMMA or PMMA-PBMA of different molecular weights. The cure intervals are 24 hours, 7 days and 1 month.
Figure 10:
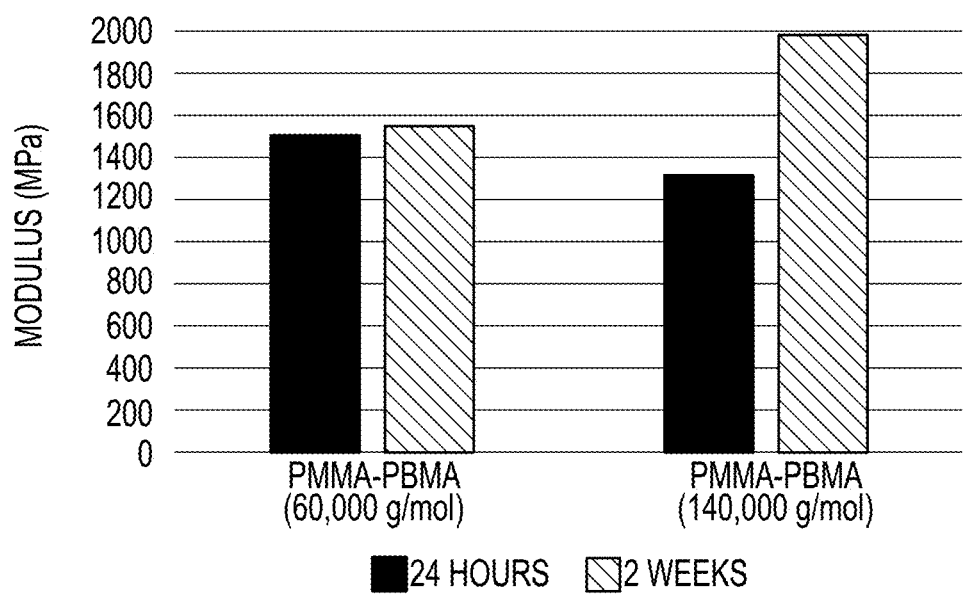
FIG. 10 depicts a bar chart of modulus (in MPa), of a cyanoacrylate composition made from ethyl cyanoacrylate containing 25 percent by weight of PMMA-PBMA of different molecular weights. The cure intervals are 24 hours and 2 weeks.

The tensile shear strength results on two different substrates are captured in Table 12 below and shown in FIG. 8.

TABLE 12

| Sample | Tensile Shear Strength (MPa) | |
| --- | --- | --- |
| | GBMS | GBAl |
| K | 26.14 | 18.38 |
| L | 20.24 | 19.54 |

The data captured in Table 13 below shows the percent loss in terms of modulus as the cured products age. These data indicate that ethyl cyanoacrylate compositions containing PBMA-PMMA fare better over time with respect to modulus than those containing PMMA, all other constituents being the same. In addition, the PBMA-PMMA-containing ethyl cyanoacrylate compositions show a lower percent modulus loss (or, a higher percent retention) of their initial modulus on ageing.

TABLE 13

| Sample | Cure Time/ Modulus (% Loss) | |
| --- | --- | --- |
| | 1 week | 1 month |
| K | 26 | 52 |
| L | 56 | 79 |

Long term ageing shows that not only does PBMA-PMMA-containing ethyl cyanoacrylate compositions have improved modulus over PMMA-containing ethyl cyanoacrylate compositions, but also that they retain flexibility more effectively.

Example 8

PMMA-PBMA Fillers of Different Molecular Weights

In Table 14, several grades of PBMA-PMMA copolymer (and one PMMA polymer) are presented showing their respective molecular weights, viscosity, stability and modulus, at 15.5 percent by weight in ethyl cyanoacrylate.

TABLE 14

| Grade | Mol Wt (Mn) | Visc. (mPa·s) | Stability/ Time (aged at RT) | Modulus/Time (MPa) | | |
|---|---|---|---|---|---|---|
| | | | | 24 hours | 7 days | 1 month |
| AC 1420 | 30,000 | 13.1 | <24 hours | 813 | 1265 | 2396 |
| AC 4830 | 60,000 | 23.5 | >1 year | 1445 | 1394 | 2389 |
| AC 2740 | 80,000 | 41.5 | <3 days | 1764 | 1710 | 2043 |
| AC 1750 | 140,000 | 76.1 | <4 days | 1594 | 1860 | 2274 |
| PMMA | 80,000 | 66.2 | >1 year | 2214 | 2194 | 2617 |

In Table 15, two grades of PBMA-PMMA copolymer (and one PMMA polymer) are presented showing their respective molecular weights and amount used in ethyl cyanoacrylate. Physical characteristics, viscosity and modulus are captured.

TABLE 15

| PBMA—PMMA Mol Wt (Mn) | Amount (Wt %) | Visc. (mPa·s) | Modulus/Time (MPa) | | |
|---|---|---|---|---|---|
| | | | 24 hours | 1 week | 2 weeks |
| 60,000 | 15.5 | 23.5 | 1445 | 1394 | Not tested |
| | 25 | 239 | 1506 | Not tested | 1564 |
| | 45 | 59,400 | 1422 | 2089 | 2103 |
| 140,000 | 15.5 | 76.1 | 1594 | 1860 | Not tested |
| | 25 | 896 | 1329 | Not tested | 1973 |
| | 45 | Semi-solid | Too thick to test | | |
| PMMA (80,000) | 15.5 | 68 | 2214 | 2194 | NT |

Based on this data, it is seen that PBMA-PMMA is advantageous over PMMA in cyanoacrylates, as the cured cyanoacrylate with PBMA-PMMA shows lower modulus (and thus greater flexibility) for up to one month. And significantly PBMA-PMMA having a molecular weight below about 80,000 Mn are preferable, as flexibility can be achieved without as significant an impact on the viscosity. More specifically, a PBMA-PMMA having a molecular weight of 140,000 Mn (along the lines disclosed in the '166 patent) shows significantly higher viscosities than PBMA-PMMA having a molecular weight of 60,000 Mn.

Example 9

Thermal Resistance of PMMA-PBMA-Containing Ethyl Cyanoacrylate Compositions When Cured Long term ageing was conducted on bonded parts constructed from grit-blasted mild steel, where the assemblies were exposed to an elevated temperature condition for the time period shown in Table 16. The parts were bonded by an ethyl cyanoacrylate composition containing PMMA or a PBMA-PMMA copolymer of either 60,000 Mn or 140,000 Mn, each in an amount appropriate to yield a viscosity in the range of about 66 to about 76 mPa·s. Samples P and Q contain the PBMA-PMMA copolymer and Sample R contains the PMMA. The assemblies were removed from the temperature condition after the given time frame and allowed to reach room temperature before testing bond strengths.

TABLE 16

| Sample | Filler | Amt (Wt %) | Bond Strength (MPa) | | Bond Strength Retained/3 |
|---|---|---|---|---|---|
| | | | 24 hour RT Cure | 3 weeks @ 120° C. | weeks @ 120° C. (%) |
| P | PBMA—PMMA (60,000 g/mol) | 19.0 | 22.96 | 11.26 | 49 |
| Q | PBMA—PMMA (140,000 g/mol) | 15.5 | 24.3 | 10.43 | 43 |
| R | PMMA (80,000 g/mol) | 15.5 | 22.231 | 9.88 | 44 |

The PBMA-PMMA-containing ethyl cyanoacrylate composition (of 60,000 Mn, Sample P) showed significant improvement in heat resistance over the PMMA counterpart (Sample R). And the PBMA-PMMA-containing ethyl cyanoacrylate composition (of 60,000 Mn, Sample P) outperformed the PBMA-PMMA-containing ethyl cyanoacrylate composition (of 140,000 Mn, Sample Q).

What is claimed is:

1. A cyanoacrylate composition comprising
    (a) a cyanoacrylate component, and
    (b) a polybutylmethacrylate-polymethylmethacrylate copolymer having a molecular weight below 80,000 Mn, and
    (c) a rubber toughening component,
wherein the rubber toughening component is selected from the group consisting of (a) reaction products of the combination of ethylene, methyl acrylate and monomers reactive with carboxylic acids, (b) dipolymers of ethylene and methyl acrylate, (c) vinylidene chloride-acrylonitrile copolymers, (d) vinyl chloride/vinyl acetate copolymer, (e) copolymers of ethylene and vinyl acetate, and combinations thereof.

2. A cyanoacrylate composition comprising
    (a) a cyanoacrylate component, and
    (b) a polybutylmethacrylate-polymethylmethacrylate copolymer having a molecular weight below 80,000 Mn, and
    (c) a rubber toughening component,
wherein the rubber toughening component is a reaction product of the combination of ethylene, methyl acrylate and monomers reactive with carboxylic acids, wherein the reaction product is free of release agents, anti-oxidants, stearic acid and polyethylene glycol ether wax.

3. The composition according to claim 1, wherein the polybutylmethacrylate-polymethylmethacrylate copolymer has a molecular weight of about 60,000 Mn.

4. The composition according to claim 2, wherein the polybutylmethacrylate-polymethylmethacrylate copolymer has a molecular weight of about 60,000 Mn.

5. The composition according to claim 1, wherein the polybutylmethacrylate-polymethylmethacrylate copolymer is present in an amount up to about 50 percent by weight of the total composition.

6. The composition according to claim 2, wherein the polybutylmethacrylate-polymethylmethacrylate copolymer is present in an amount up to about 50 percent by weight of the total composition.

7. The composition according to claim 1, wherein the polybutylmethacrylate-polymethylmethacrylate copolymer is present in an amount in the range of about 2 percent by weight to about 45 percent by weight of the total composition.

8. The composition according to claim 2, wherein the polybutylmethacrylate-polymethylmethacrylate copolymer is present in an amount in the range of about 2 percent by weight to about 45 percent by weight of the total composition.

9. The composition according to claim 1, wherein the polybutylmethacrylate-polymethylmethacrylate copolymer is present in an amount of about 20 percent by weight of the total composition.

10. The composition according to claim 2, wherein the polybutylmethacrylate-polymethylmethacrylate copolymer is present in an amount of about 20 percent by weight of the total composition.

11. The composition according to claim 1, wherein the composition is flowable at room temperature.

12. The composition according to claim 2, wherein the composition is flowable at room temperature.

13. The composition according to claim 1, wherein the composition has a viscosity up to about 175,000 mPa·s.

14. The composition according to claim 2, wherein the composition has a viscosity up to about 175,000 mPa·s.

15. The composition according to claim 1, wherein the polybutylmethacrylate-polymethylmethacrylate copolymer is present in an amount up to about 50 percent by weight of the total composition and a viscosity up to about 175,000 mPa·s.

16. The composition according to claim 2, wherein the polybutylmethacrylate-polymethylmethacrylate copolymer is present in an amount up to about 50 percent by weight of the total composition and a viscosity up to about 175,000 mPa·s.

\* \* \* \* \*